(12) United States Patent
Yamamoto et al.

(10) Patent No.: US 10,781,925 B2
(45) Date of Patent: Sep. 22, 2020

(54) BUTTERFLY VALVE SEAT RING AND BUTTERFLY VALVE PROVIDED WITH SAME

(71) Applicant: ASAHI YUKIZAI CORPORATION, Nobeoka-shi, Miyazaki (JP)

(72) Inventors: Yukihisa Yamamoto, Nobeoka (JP); Seiji Yamashita, Nobeoka (JP)

(73) Assignee: ASAHI YUKIZAI CORPORATION, Nobeoka-Shi, Miyazaki (JP)

( * ) Notice: Subject to any disclaimer, the term of this patent is extended or adjusted under 35 U.S.C. 154(b) by 7 days.

(21) Appl. No.: 16/310,687

(22) PCT Filed: Jun. 2, 2017

(86) PCT No.: PCT/JP2017/020606
§ 371 (c)(1),
(2) Date: Dec. 17, 2018

(87) PCT Pub. No.: WO2017/217257
PCT Pub. Date: Dec. 21, 2017

(65) Prior Publication Data
US 2019/0331230 A1    Oct. 31, 2019

(30) Foreign Application Priority Data
Jun. 17, 2016   (JP) ................. 2016-120675

(51) Int. Cl.
*F16K 1/226*   (2006.01)

(52) U.S. Cl.
CPC .......... *F16K 1/2263* (2013.01); *F16K 1/2265* (2013.01)

(58) Field of Classification Search
CPC ...... F16K 1/2263; F16K 1/2265; F16K 1/224; F16K 27/0218; F16K 1/42; F16K 1/226
(Continued)

(56) References Cited

U.S. PATENT DOCUMENTS

| 3,633,872 A | 1/1972 | Wright |
| 3,727,883 A | 4/1973 | Conners et al. |

(Continued)

FOREIGN PATENT DOCUMENTS

| CN | 202040347 U | 11/2011 |
| CN | 202708117 U | 1/2013 |

(Continued)

OTHER PUBLICATIONS

PCT/IB/338, "Notification of Transmittal of Copies of Translation of the International Preliminary Report on Patentability for International Application No. PCT/JP2017/020606," Dec. 27, 2018.

(Continued)

*Primary Examiner* — Michael R Reid
(74) *Attorney, Agent, or Firm* — Mananbu Kanesaka (57) ABSTRACT

A seat ring for a butterfly valve is mounted on an inner peripheral surface of an internal flow passage extending along the flow passage axis in a valve body of the butterfly valve, so that an outer peripheral edge surface of a valve element supported to be rotatable in the internal flow passage by a valve stem supported by the valve body abuts on the seat ring. The seat ring includes a ring body having a cylindrical shape and extending in the center axis direction, and the ring body is formed at positions opposite to each other in a radial direction of the ring body with a pair of through-holes for allowing the valve stem to pass through. On an outer peripheral surface of the ring body, arcuate projections extending in a circumferential direction are formed apart from the pair of through-holes.

9 Claims, 6 Drawing Sheets

(58) Field of Classification Search
USPC .................................................. 251/305–306
See application file for complete search history.

(56) References Cited

U.S. PATENT DOCUMENTS

| | | | | |
|---|---|---|---|---|
| 4,133,513 | A | * | 1/1979 | Meyer .................. F16K 1/2268 251/306 |
| 5,681,025 | A | | 10/1997 | Kuhn et al. |
| 2006/0163520 | A1 | | 7/2006 | Shakagori et al. |
| 2009/0039305 | A1 | | 2/2009 | Shakagori et al. |

FOREIGN PATENT DOCUMENTS

| | | | |
|---|---|---|---|
| EP | 0572333 | A1 | 12/1993 |
| JP | S57-179658 | U | 11/1982 |
| JP | S58-061369 | A | 4/1983 |
| JP | H04-129972 | U | 11/1992 |
| JP | H10-47499 | A | 2/1998 |
| JP | 2004-183711 | A | 7/2004 |
| JP | 2004-239276 | A | 8/2004 |
| JP | 2006-283873 | A | 10/2006 |
| JP | 2011-058509 | A | 3/2011 |
| WO | 96/22482 | A1 | 7/1996 |

OTHER PUBLICATIONS

PCT/IB/373, "International Preliminary Report on Patentability for International Application No. PCT/JP2017/020606," Dec. 18, 2018.
PCT/ISA/237, "Written Opinion of the International Searching Authority for International Application No. PCT/JP2017/020606," Aug. 1, 2017.
China Patent Office, "Office Action for Chinese Patent Application No. 201780037410.5," dated Jul. 26, 2019.
PCT/ISA/210, "International Search Report for International Application No. PCT/JP2017/020606," dated Aug. 1, 2017.
Europe Patent Office, "Search Report for European Patent Application No. 178131595," dated Jan. 15, 2020.
Japan Patent Office, "Office Action for Japanese Patent Application No. 2016-120675," dated Jan. 21, 2020.

* cited by examiner

BUTTERFLY VALVE SEAT RING AND BUTTERFLY VALVE PROVIDED WITH SAME

RELATED APPLICATIONS

The present application is National Phase of International Application No. PCT/JP2017/020606 filed Jun. 2, 2017, and claims priority from Japanese Application No. 2016-120675, filed Jun. 17, 2016, the disclosure of which is hereby incorporated by reference herein in its entirety.

TECHNICAL FIELD

The present invention relates to a butterfly valve seat ring and a butterfly valve using the same which are suitably used for piping lines of various industries, such as chemical factories, water and sewage, agriculture and fishery, a semiconductor manufacture field, and a food field.

BACKGROUND ART

A butterfly valve includes a valve body having an internal flow passage formed therein, a seat ring mounted on the inner peripheral surface of the internal flow passage of the valve body, a valve stem extending through the seat ring and supported by the valve body, and a valve element disposed in the seat ring mounted on the inner peripheral surface of the internal flow passage of the valve body and fixedly mounted to the valve stem so as to rotate with the valve stem. The valve element is rotated using the valve stem in the valve body so that the outer peripheral edge surface of the valve element is brought into pressure contact with or separated from the inner peripheral surface of the seat ring, thereby opening and closing the valve.

The valve body is formed at positions opposite to each other in the radial direction of the internal flow passage with a pair of valve stem support holes for inserting and supporting the valve stem, and at least one of the holes extends through the valve body. The seat ring includes a ring body of a substantially cylindrical shape extending in the center axis direction and annular flange portions provided at both end portions in the center axis direction of the ring body and extending outward and is mounted on the inner peripheral surface of the internal flow passage of the valve body by fitting the flange portions of the seat ring to recessed fitting portions provided in the surrounding areas of opening portions at both ends of the internal flow passage of the valve body. The ring body of the seat ring is formed at positions opposite to each other in the radial direction thereof with a pair of through-holes for allowing the valve stem to pass through.

In such a butterfly valve, a leakage of a fluid to the outside through the through-hole is prevented by bringing the outer peripheral edge surface of the valve element and the inner peripheral surface of the seat ring in close contact with each other near the through-hole. However, when an opening-and-closing operation is repeatedly performed by the rotation of the valve element, the vicinity of the through-hole of the seat ring is elastically deformed, so that the sealability between the valve element and the seat ring near the through-hole decreases. When the sealability decreases and a fluid enters between the outer peripheral surface of the seat ring and the inner peripheral surface of the internal flow passage of the valve body through a gap between the valve stem and the inner peripheral surface of the through-hole of the seat ring, the seat ring is swelled inward, which may cause an increase in operation torque or an impediment to the rotation of the valve element to a valve closing position. In order to prevent such a leakage of a fluid through the through-hole, PTL1 proposes a butterfly valve in which a bush provided with a flange portion on the outer peripheral surface side of a seat ring is inserted into a through-hole of the seat ring and fitted to a valve stem fitting hole provided in a valve element so as to stop water in a state where the top surface of the flange portion does not project from the outer peripheral surface of the seat ring.

Further, the butterfly valve may pose a problem that the seat ring is moved in the flow direction by friction caused between the outer peripheral edge surface of the valve element and the inner peripheral surface of the seat ring during the rotation of the valve element accompanied by the opening and closing of the valve or an action of fluid pressure on the seat ring in closing the valve, so that the sealability decreases. PTL2 proposes a butterfly valve seat ring which prevents such movement in the flow direction of a seat ring by forming an annular projection portion extending in the circumferential direction on the outer peripheral surface of the seat ring and forming an annular recessed portion, into which the annular projection portion is fitted, on the inner peripheral surface of a valve body.

CITATION LIST

Patent Literature

PTL1: Japanese Unexamined Patent Publication No. 2011-58509

PTL2: Japanese Unexamined Patent Publication No. 10-47499

SUMMARY OF THE INVENTION

Technical Problem

In order to simultaneously solve the above-described two problems, it can be considered that an annular projection portion is provided on the outer peripheral surface of a seat ring and a bush is inserted into a through-hole. When the bush described in PTL2 is inserted into the through-hole, it is necessary to mount on an internal flow passage of a valve body an assembly in which the bush inserted into a through-hole of a seat ring is inserted into and fitted to a valve stem hole of the valve element, in a state where a valve element is fitted into the center of the seat ring. However, the seat ring assembly in the state where the valve element is fitted into the center of the seat ring cannot be deformed into the valve stem direction due to the presence of the valve element. Therefore, when the annular projection portion is formed on the outer peripheral surface of the seat ring, there arises a problem that the annular projection portion serves as an obstacle to make it difficult to press the seat ring assembly into the internal flow passage of the valve body.

Accordingly, it is an object of the present invention to solve the problems existing in the prior art and provide a butterfly valve seat ring and a butterfly valve using the same, which enables easy assembly of a butterfly valve while maintaining the sealability between a valve stem and the seat ring.

Solution to Problem

In view of the above-described object, the present invention provides, as a first aspect, a butterfly valve seat ring, adapted to be mounted on an inner peripheral surface of an internal flow passage extending along a flow passage axis and formed in a valve body of a butterfly valve, so that an outer peripheral edge surface of a valve element supported to be rotatable in the internal flow passage by a valve stem supported by the valve body abuts on the butterfly valve seat ring, the butterfly valve seat ring including a ring body having a cylindrical shape and extending in the center axis direction, in which the ring body is formed at positions opposite to each other in a radial direction of the ring body with a pair of through-holes for allowing the valve stem to pass through, and an arcuate projection extending in a circumferential direction is formed apart from the pair of through-holes on an outer peripheral surface of the ring body.

In the butterfly valve seat ring described above, the arcuate projection is formed on the outer peripheral surface of the seat ring. Therefore, when the seat ring is mounted on the inner peripheral surface of the internal flow passage of the valve body in a state where the arcuate projection is fitted to an arcuate groove formed in the inner peripheral surface of the internal flow passage of the valve body of the butterfly valve, the seat ring can be prevented from moving in the flow passage axis direction. Further, the arcuate projection is formed apart from the pair of through-holes on the outer peripheral surface of the seat ring. That is to say, the arcuate projection is not formed near the through-holes. Therefore, even in a state where the valve element is fitted into the center of the seat ring, so that the seat ring cannot be compressed and deformed in a direction connecting the two through-holes, i.e., valve stem direction, the press-in is not inhibited because the projection is not formed on the outer peripheral surface of the seat ring in the valve stem direction where the seat ring cannot be compressed and deformed. Moreover, when the valve element having a disk shape is rotated from a closed state to a opened state, the seat ring can be easily compressed and deformed by acting force inward in a direction perpendicular to the valve stem direction, and a portion where the arcuate projection is provided does not inhibit insertion of the seat ring into the internal flow passage of the valve body. Therefore, it is facilitated to mount the seat ring on the internal flow passage of the valve body.

It is preferable that the seat ring further includes flange portions extending outward in the radial direction at both end portions in the center axis direction of the ring body. When such flange portions are provided in the both end portions in the flow passage axis direction of the seat ring, the valve body is sandwiched between the flange portions, which makes it more difficult for the seat ring to move in the flow passage axis direction.

Further, it is preferable that the ring body has an outer circumference of an oval shape and an inner circumference of a circular shape, so that portions where the pair of through-holes is formed are thicker than another portion. In the ring body of the seat ring, a portion where the arcuate projection is formed is thick corresponding to the height of the arcuate projection. Therefore, when the ring body has uniform thickness, a portion where the arcuate projection is not formed is relatively thin as compared with the portion where the arcuate projection is formed. As a result, the compression allowance decreases, so that the seal pressure is nonuniform. However, when the ring body is configured as described above, a difference in the compression allowance between the portion where the arcuate projection is formed and the portion where the arcuate projection is not formed can be reduced, so that more uniform seal pressure can be obtained.

Furthermore, it is preferable that the arcuate projection has a rectangular cross section.

The present invention provides, as a second aspect, a butterfly valve including: a valve body having an internal flow passage formed therein and extending along a flow passage axis; the above-described seat ring mounted on an inner peripheral surface of the internal flow passage; a valve stem extending through a pair of through-holes of the seat ring; and a valve element of a disk shape supported to be rotatable in the valve body by the valve stem, in which the seat ring is mounted on the inner peripheral surface of the internal flow passage of the valve body in a state where an arcuate projection formed on an outer peripheral surface of the seat ring is fitted to an arcuate groove formed on the inner peripheral surface of the internal flow passage of the valve body, and the valve element is rotated in the valve body so that the outer peripheral edge surface of the valve element is brought into pressure contact with or separated from an inner peripheral surface of the seat ring, thereby opening and closing the valve.

In the above butterfly valve, it is preferable that a bush is inserted into and fitted to each of the pair of through-holes.

Advantageous Effects of the Invention

According to the present invention, the arcuate projection is formed on the outer peripheral surface of the seat ring. Therefore, by fitting the arcuate projection to the corresponding arcuate groove formed on the inner peripheral surface of the internal flow passage of the valve body of the butterfly valve, the seat ring can be prevented from moving in the flow passage axis direction, so that a sealability reduction due to movement of the seat ring in the flow passage axis direction can be prevented. Further, the arcuate projection is formed apart from the pair of through-holes on the outer peripheral surface of the seat ring. Therefore, even in a state where the valve element is fitted into the center of the seat ring, so that the seat ring cannot be compressed and deformed in the valve stem direction, which can occur when a bush is fitted into the through-hole, for example, the arcuate projection does not inhibit insertion of the seat ring into the valve body. As a result, it is facilitated to mount the seat ring on the valve body and assembly of the butterfly valve is facilitated.

DESCRIPTION OF EMBODIMENTS

While an embodiment of a butterfly valve seat ring and a butterfly valve using the same according to the present invention will be described below with reference to the drawings, it goes without saying that the present invention should not be limited to the embodiment.

First, an overall configuration of a butterfly valve 11 will be described with reference to FIG. 1 to FIG. 3. The butterfly valve 11 includes a valve body 13, a seat ring 15, a valve element 17, and a valve stem 19.

The valve body 13 is formed of metal material, synthetic resin material such as polypropylene (PP), or any other rigid material and has a substantially cylindrical shape in which an internal flow passage 13a extending along the flow passage axis is formed. Further, a top flange 21 of a substantially disk shape is provided at an upper portion of the valve body 13. The valve body 13 is formed with valve stem support holes 13b, 13b extending from the internal flow passage 13a and facing each other in the radial direction (vertical direction in FIG. 1) of the internal flow passage. One of the valve stem support holes 13b extends through the top flange 21 to the outside.

The seat ring 15 is formed of elastic material, such as ethylene propylene rubber (EPDM), chloroprene rubber (CR), isoprene rubber (IR), chlorosulfonated rubber (CSM), nitrile rubber (NBR), styrene butadiene rubber (SBR), chlorinated polyethylene (CM), fluororubber (FKM), hydrogenated acrylonitrile butadiene rubber (HNBR), urethane rubber (U), silicone rubber (VMQ, FVMQ), ethylene propylene rubber (EPM), acrylic rubber (ACM), and butyl rubber (IIR). The seat ring 15 includes a ring body 15a having a substantially cylindrical shape and extending in the center axis direction, and flange portions 15b, 15b extending outward opposite to each other from both end portions in the center axis direction of the ring body 15a, and the ring body 15a is formed with a pair of through-holes 15c, 15c for allowing the valve stem 19 to pass through being positioned opposite to each other in the radial direction of the ring body 15a as well shown in FIG. 3. The ring body 15a is formed to have the inner circumference of a circular shape and the outer circumference of an oval shape having the major axis extending in the center axis direction of the through-holes 15c, 15c so that the thickness of portions where the through-holes 15c, 15c are formed is the largest. Further, tab portions 15d, 15d extending toward each other are formed at the outer peripheral edge portions of the flange portions 15b, 15b opposite to each other.

Figure 3:
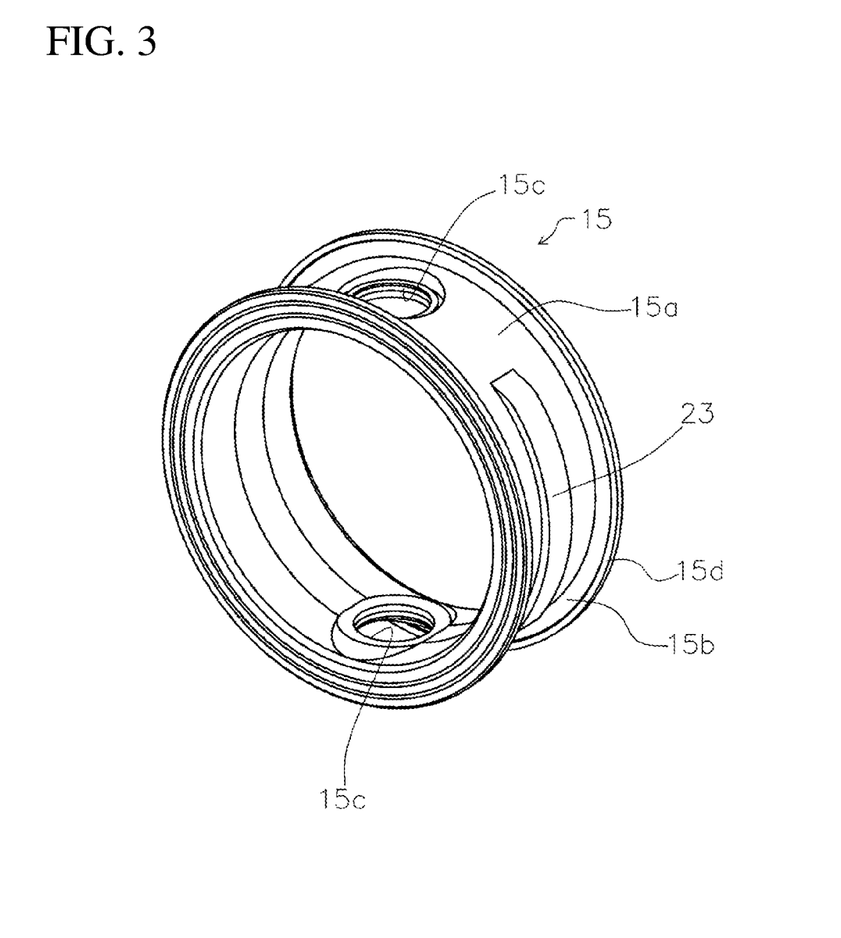
FIG. 3 is a perspective view showing the seat ring shown in FIG. 1.
Figure 4:
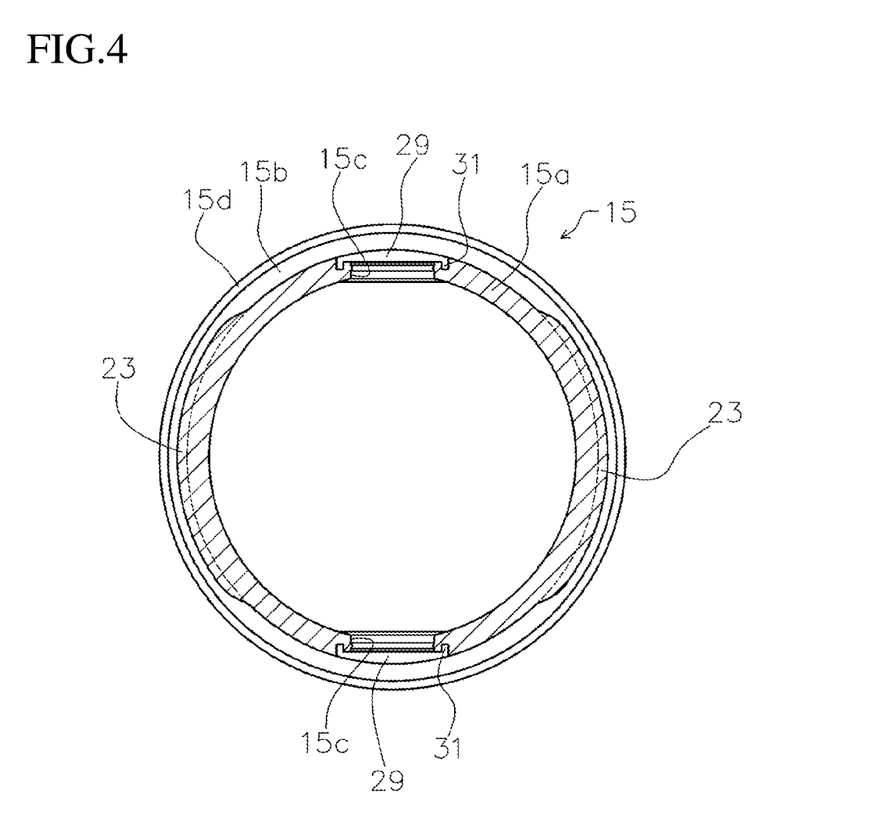
FIG. 4 is a cross-sectional view of the seat ring shown in FIG. 3.
Figure 6:
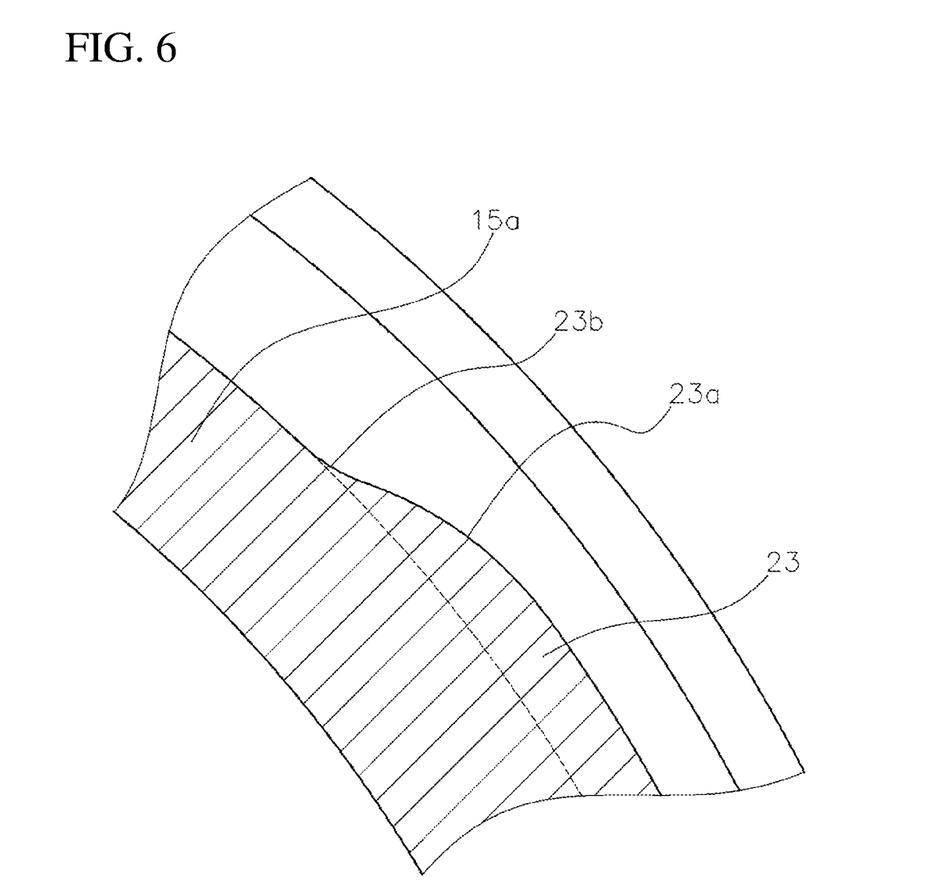
FIG. 6 is a partial enlarged cross-sectional view of an arcuate projection portion of the seat ring shown in FIG. 4.

Furthermore, as is shown well with reference to FIG. 3, arcuate projections 23 extending in the circumferential direction are formed apart from the pair of through-holes 15c, 15c described above on the outer peripheral surface of the ring body 15a. In the shown embodiment, for the purpose of obtaining uniform seal pressure and the purpose of thickening a portion abutting on the outer peripheral edge surface of the valve element 17 to increase the compression allowance to improve the sealability, one arcuate projection 23 extending in the circumferential direction is individually formed at a center portion in the center axis direction of each of two regions sandwiched between the pair of through-holes 15c, 15c on the outer peripheral surface of the ring body 15a. However, a plurality of arcuate projections 23, 23 apart from each other may be formed in each region or a plurality of rows of the arcuate projections 23, 23 may be formed in parallel in the center axis direction of the ring body 15a, as long as the arcuate projection 23 is not formed near the pair of through-holes 15c, 15c. It is preferable that the arcuate projections 23, 23 extend by an equal length toward the pair of through-holes 15c, 15c from center positions (hereinafter referred to as "center position in the transverse direction) which are positions at an equal distance from the through-holes 15c and 15c. i.e., positions apart by 90° around the center axis of the seat ring from the centers of the through-holes 15c, 15c, and it is more preferable that the arcuate projections 23, 23 extend within the range of ±45° around the center axis from the center positions in the transverse direction. Moreover, it is preferable that the arcuate projections 23, 23 have a rectangular cross section. As shown in FIG. 6 in detail, the arcuate projection 23 is smoothly connected to the ring body 15a by a convex first curved portion 23a and a concave second curved portion 23b having a radius smaller than that of the first curved portion 23a.

Such a seat ring 15 is mounted on the inner peripheral surface of the internal flow passage 13a of the valve body 13. In detail, as shown in FIG. 2, recessed fitting portions 13c are formed at both end portions in the flow passage axis direction of the valve body 13 so as to surround opening portions of end portions of the internal flow passage 13a, and the seat ring 15 is mounted on the inner peripheral surface of the internal flow passage 13a of the valve body 13 in such a manner as to sandwich the valve body 13 between the two flange portions 15b, 15b by fitting each flange portion 15b of the seat ring 15 to each recessed fitting portion 13c. At this time, the seat ring 15 is positioned with respect to the valve body 13 so that the through-holes 15c, 15c of the seat ring 15 are aligned with the valve stem support holes 13b, 13b of the valve body 13. The inner peripheral surface of the internal flow passage 13a of the valve body 13 is formed with arcuate grooves 25, 25 having a complementary shape with the arcuate projection 23 and extending in the circumferential direction at positions corresponding to the arcuate projections 23, 23 of the seat ring 15 mounted on the inner peripheral surface of the internal flow passage 13a of the valve body 13 so that the through-holes 15c, 15c is are aligned with the valve stem support holes 13b, 13b, and the arcuate projections 23, 23 are fitted to the arcuate grooves 25, 25.

The valve element 17 is formed of synthetic resin material, such as polypropylene (PP), has a substantially disk shape, and is disposed inside the seat ring 15 in the internal flow passage 13a of the valve body 13. The valve element 17 is formed at the center thereof with a valve stem hole 17a extending through the valve element 17. The valve stem 19 is inserted into and fixed to the valve stem hole 17a so as to be unrotatable relative to the valve element 17.

The valve stem 19 can be formed, for example, of metal material, such as stainless steel. The valve stem 19 is fixed to the valve stem hole 17a so that both end portions thereof project from the valve stem hole 17a of the valve element 17 and the both ends portion of the valve stem 19 projecting from the valve stem hole 17a are rotatably supported by the valve stem support hole 13b of the valve body 13. Thus, the valve element 17 is supported so as to be rotatable relative to the valve body 13. A valve stem portion inserted into the valve stem support hole 13b on the side of the top flange 21 projects and extends from the top flange 21 so that the valve element 17 can be operated from the outside. By connecting actuators (not shown), attached onto the top flange 21, such as a lever type actuator, a gear type actuator, or an automatic actuator, to the projection portion, the valve element 17 is rotated via the valve stem 19 so that the outer peripheral edge surface of the valve element 17 is brought into pressure contact with or separated from the inner peripheral surface of the seat ring 15 mounted on the inner peripheral surface of the internal flow passage 13a of the valve body 13, thereby opening and closing the internal flow passage 13a of the valve body 13.

Figure 1:
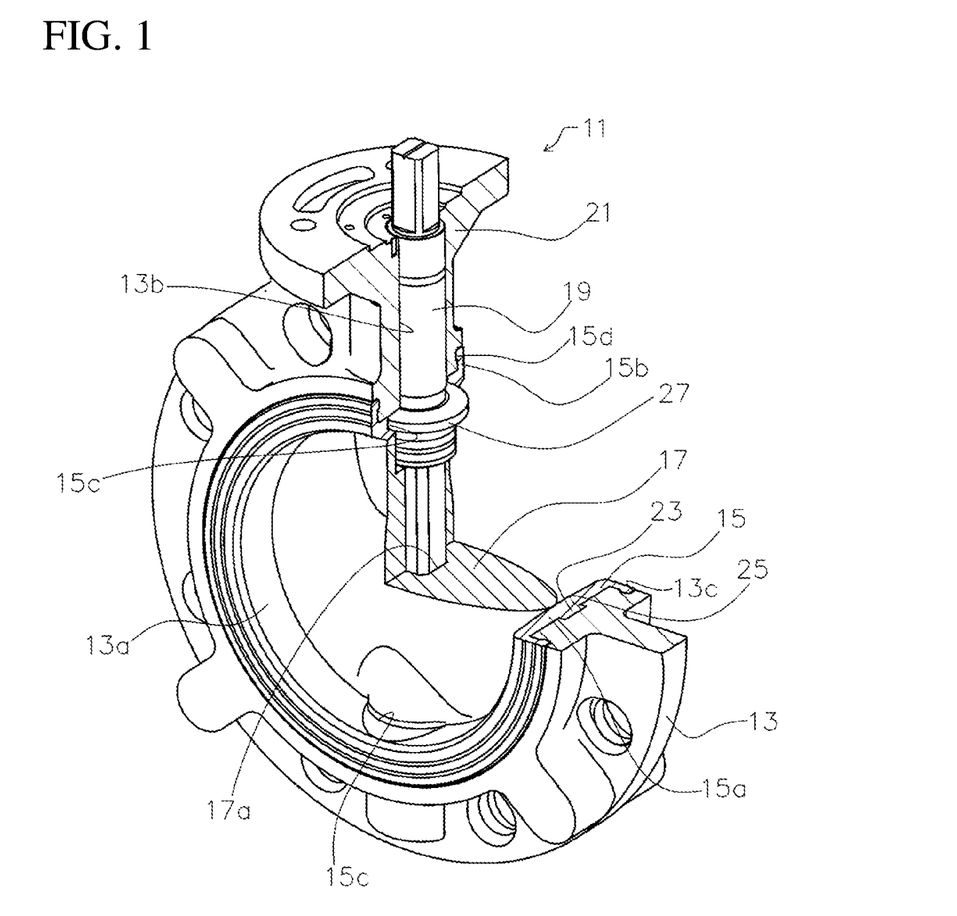
FIG. 1 is a partial cross-sectional perspective view showing the overall configuration of a butterfly valve using a seat ring according to the present invention.
Figure 2:
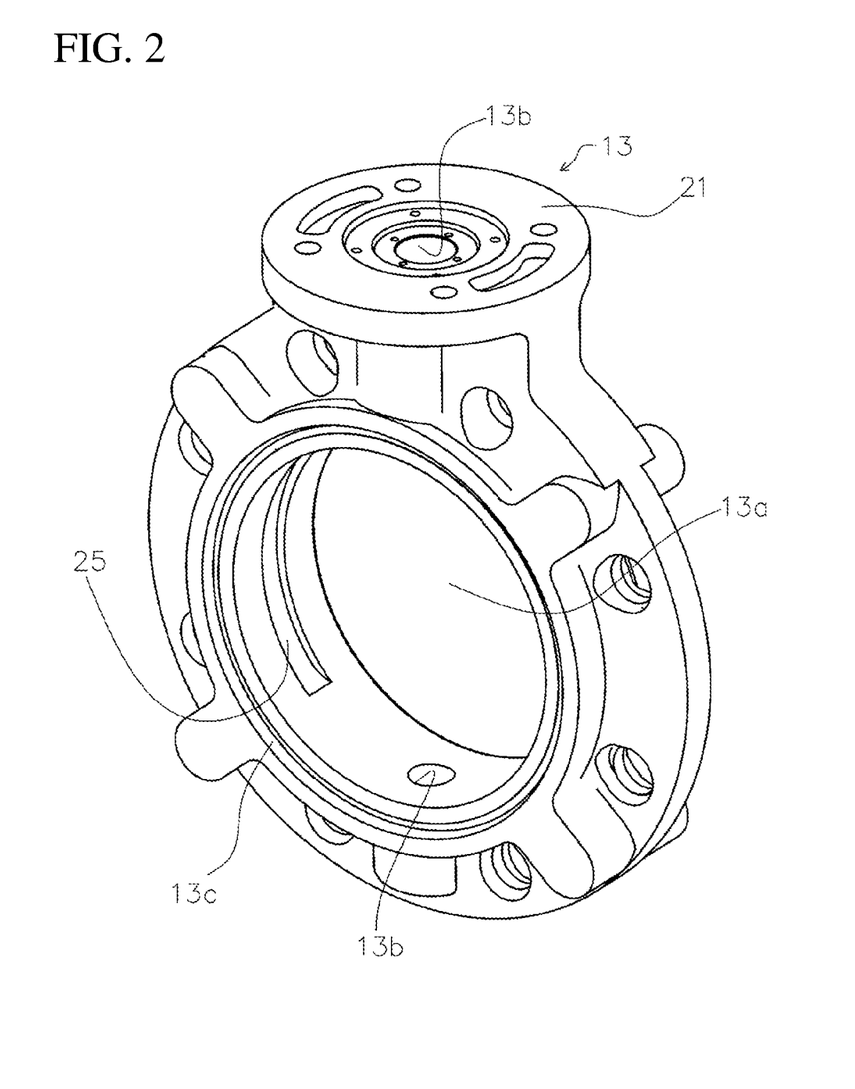
FIG. 2 is a perspective view showing the valve body shown in FIG. 1.
Figure 5:
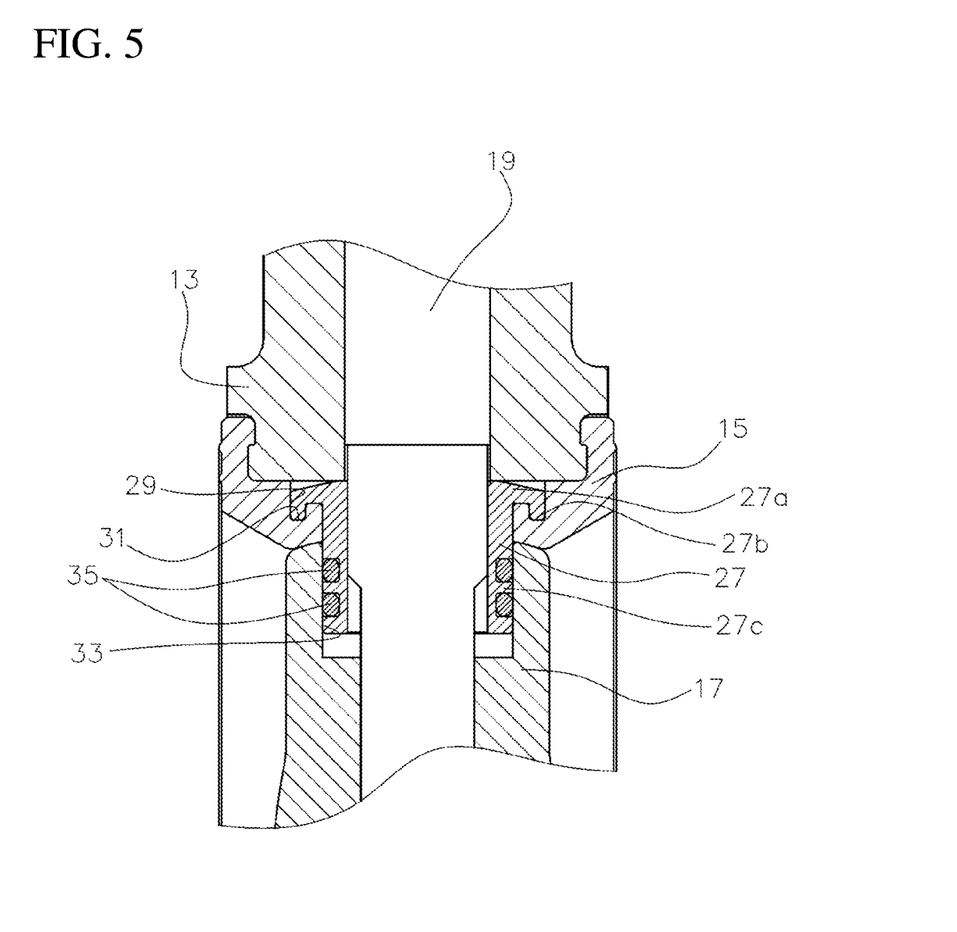
FIG. 5 is a partial enlarged cross-sectional view of a through-hole portion of the butterfly valve shown in FIG. 1.

In the embodiment shown in FIG. 1, in order to improve the sealability between the outer peripheral surface of the valve stem 19 and the inner peripheral surface of the through-hole 15c of the seat ring 15 and the inner peripheral surface of the valve stem hole 17a of the valve element 17, a cylindrical bush 27 formed of synthetic resin material, such as polypropylene (PP), is disposed near the through-hole 15c of the seat ring 15 and an opening portion of the valve stem hole 17a of the valve element 17. As well shown in FIG. 5, the bush 27 has a flange portion 27a formed at an end portion to be disposed on the outer circumferential side of the seat ring 15 and an annular projection portion 27b formed on the outer edge of the flange portion 27a to project toward the inner circumferential side of the seat ring 15. When the bush 27 is inserted into and fitted to the through-hole 15c of the seat ring 15, the flange portion 27a and the annular projection portion 27b are brought into a state of being fitted to the recessed fitting portion 29 and the groove fitting portion 31, respectively, formed in the surrounding area of the through-hole 15c of the seat ring 15 to prevent the deformation of the through-hole 15c accompanied by the rotation of the valve element 17 and the valve stem 19 and configure a seal portion between the flange portion 27a and the annular projection portion 27b and the outer peripheral surface of the seat ring 15. The top surface of the flange portion 27a of the bush 27 is formed so as to be the same curved surface as the curved surface of the outer peripheral surface of the seat ring 15 when the bush 27 is inserted into the through-hole 15c of the seat ring 15 to fit the flange portion 27a to the recessed fitting portion 29 and abuts on the inner peripheral surface of the internal flow passage 13a of the valve body 13 integrally with the outer peripheral surface of the seat ring 15. An end portion of the bush 27 to be disposed on the inner peripheral side of the seat ring 15 projects from the through-hole 15c of the seat ring 15 and serves as a valve element fitting portion 27c to be fitted to a recessed bush fitting portion 33 provided on the opening portion of the valve stem hole 17a of the valve element 17. A seal member 35, such as an O ring, is attached to the outer peripheral surface of the valve element fitting portion 27c and abuts on the inner peripheral surface of the recessed bush fitting portion 33 of the valve element 17, thereby improving the sealability between the valve element fitting portion 27c and the recessed bush fitting portion 33.

Although, polyvinyl chloride (PVC) and polyvinylidene fluoride (PVDF) can be used as the materials of the valve body 13 and the valve element 17, besides polypropylene, synthetic resin materials, such as polyethylene (PE), polyphenylene sulfide (PPS), polydicyclopentadiene (PDCPD), polytetrafluoroethylene (PTFE), acrylonitrile butadiene styrene resin (ABS resin), chlorinated polyvinyl chloride (PVC-C), perfluoroalkoxylalkane (PFA), and fiber-reinforced plastic (FRP), those obtained by strengthening the synthetic resin materials with glass fibers and the like, or metals, such as cast iron, cast steel, carbon steel, copper, copper alloy, brass, aluminum, stainless steel, and titanium, may be used, and those obtained by coating the metals with synthetic resin materials may be used, as long as the strength and the properties required for the butterfly valve are satisfied. However, the valve body 13 and the valve element 17 are preferably formed of synthetic resin material. The reason is because the seat ring 15 according to the present invention is suitably applied to the butterfly valve 11 having a large diameter, and the valve body 13 and the valve element 17 formed of synthetic resin material are markedly light as compared with a case where the valve body 13 and the valve element 17 are formed of metal material, thereby improving the working efficiency. Further, the valve body 13 and the valve element 17 formed of synthetic resin material can be used for the application of a corrosive fluid without causing no problems.

The material of the valve stem 19 is not particularly limited insofar as the materials have no problems in terms of strength, and cast iron, cast steel, carbon steel, copper, copper alloy, brass, aluminum, titanium, or the like can be used besides stainless steel.

As the material of the seat ring 15, synthetic resin, such as polytetrafluoroethylene (PTFE), polyvinylidene fluoride (PVDF), or perfluoroalkoxylalkane (PFA), those obtained by laminating the synthetic resin material on the rubber material described above or coating the rubber material described above with the synthetic resin material, or the like is usable besides the rubber materials described above, and the material is not particularly limited insofar as the material have no problems of the strength or corrosion resistance required for the intended use.

The material of the bush 27 may be synthetic resin material or metal material insofar as the material have corrosion resistance and have such strength that the bush 27 is not broken even when distorted and are not particularly limited. However, polyvinyl chloride (PVC), polypropylene (PP), polyvinylidene fluoride (PVDF), chlorinated polyvinyl chloride (PVC-C), polytetrafluoroethylene (PTFE), perfluoroalkoxylalkane (PFA), or polyethylene (PE) is preferable. This is because, metal is often used as the material of the valve stem 19 and, in the case where the material of the bush 27 is polyvinyl chloride (PVC), polypropylene (PP), polyvinylidene fluoride (PVDF), or chlorinated polyvinyl chloride (PVC-C), the valve stem 19 can be prevented from corroding even when a corrosive fluid flows through the valve and the same effect as those in a case where the valve stem 19 is subjected to corrosion resistant coating by the bush 27 can be obtained.

Next, a method for assembling the butterfly valve 11 shown in FIG. 1 will be described.

When the bush 27 is used as in the embodiment shown in FIG. 1, it is necessary that the top surface of the flange portion 27a of the bush 27 and the outer peripheral surface of the seat ring 15 abuts on the inner peripheral surface of the internal flow passage 13a of the valve body 13 and the valve element fitting portion 27c of the bush 27 is fitted to the recessed bush fitting portion 33 of the valve element 17. Therefore, the bush 27 should be inserted into and fitted to the through-holes 15c, 15c of the seat ring 15 and the recessed bush fitting portions 33, 33 of the valve element 17 before the seat ring 15 is mounted on the inner peripheral surface of the internal flow passage 13a of the valve body 13.

For this reason, a seat ring assembly is assembled which has the bush 27 inserted into and fitted to each of the through-holes 15c, 15c of the seat ring 15 and each recessed bush fitting portion 33 of the valve element 17. For example, the seat ring assembly can be assembled as follows. First, the bushes 27, 27 are individually inserted into the two through-holes 15c, 15c of the seat ring 15 while matching the curved surface of the outer peripheral surface of the seat ring 15 and the curved surface of the top surface of the flange portion 27a of the bush 27 with each other, the flange portion 27a and the annular projection portion 27b of the bush 27 are fitted to the recessed fitting portion 29 and the groove fitting portion 31, respectively, of the seat ring 15, and then the bushes 27, 27 are fitted to the through-holes 15c, 15c so that the top surface of the flange portion 27a of the bush 27 does not project from the outer peripheral surface of the seat ring 15. At this time, the annular projection portion 27b is deeply fitted to the groove fitting portion 31, and therefore the bush 27 is not removed from the seat ring 15 during assembly. Assembly is thus facilitated. Next, force is applied to the seat ring 15 inward from both sides of the seat ring 15 in a direction perpendicular to the center axis direction of the through-hole 15c to crush the seat ring 15 in a direction perpendicular to the center axis of the through-holes 15c, 15c until the distance between end portions on the side of the inner peripheral surface of the seat ring 15 of the bushes 27, 27 fitted to the two through-holes 15c, 15c of the seat ring 15 becomes longer than the length in the valve stem direction of the valve element 17. After crushing the seat ring 15, the valve element 17 is arranged between the two bushes 27, 27 so as to be in a half-opening position or a full opening position; the valve element fitting portion 27c of one bush is inserted into one recessed bush fitting portion 33 of the valve element 17; the valve element fitting portion 27c of the other bush is inserted into the other recessed bush fitting portion 33 while reducing the force applied to the seat ring 15; the force applied to the seat ring 15 is completely released; and then the bush 27 is pressed in the valve stem direction to fit the valve element fitting portion 27c of the bush 27 to the recessed bush fitting portion 33 of the valve element 17. At this time, the valve element fitting portion 27c of the bush 27 projects from the inner peripheral surface of the seat ring 15, and therefore the center of the recessed bush fitting portion 33 of the valve element 17 and the center of the through-hole 15c of the seat ring 15 can be aligned without fine adjustment. Assembly is thus facilitated.

Next, the assembly is pressed into the internal flow passage 13a of the valve body 13 such that the center axis of the through-hole 15c of the seat ring 15 and the center axis of the valve stem support hole 13b of the valve body 13 are aligned with each other, the flange portions 15b, 15b of the seat ring 15 of the assembly are fitted to the recessed fitting portions 13c, 13c of the valve body 13, and then the seat ring 15 of the assembly is mounted on the inner peripheral surface of the internal flow passage 13a of the valve body 13 in such a manner as to sandwich the valve body 13 between the two flange portions 15b, 15b. Simultaneously, the arcuate projection 23 formed on the outer peripheral surface of the seat ring 15 is fitted to the arcuate groove 25 formed in the inner peripheral surface of the internal flow passage 13a of the valve body 13.

In the state of the seat ring assembly having the valve element 17 disposed in the seat ring 15, the valve element 17 serves as an obstacle, so that the ring body 15a of the seat ring 15 cannot be compressed and deformed in a direction (i.e., valve stem direction) connecting the two through-holes 15c, 15c. As a result, when the "annular" projection extending in the circumferential direction is provided on the outer peripheral surface of the ring body 15a, the annular projection interferes with the surrounding portion of the internal flow passage 13a of the side surface of the valve body 13 to serve as an obstacle, which makes it difficult to press the seat ring assembly into the internal flow passage 13a of the valve body 13, and thus assembly becomes difficult. However, in this embodiment, no projections are provided near the through-holes 15c, 15c on the outer peripheral surface of the ring body 15a of the seat ring 15, which makes it easy to press the seat ring assembly into the internal flow passage 13a of the valve body 13. Further, when the valve element 17 is rotated to the half opening position or the full opening position, the ring body 15a of the seat ring 15 can be compressed and deformed inward in the direction perpendicular to the valve stem direction, and thus the arcuate projections 23, 23 do not serve as an obstacle, which makes it possible to press the seat ring assembly into the internal flow passage 13a of the valve body 13.

Next, the valve stem 19 is inserted into the valve stem support hole 13b of the valve body 13 from the top flange 21 side in the state where the seat ring assembly is mounted on the internal flow passage 13a of the valve body 13 to be caused to pass through the two bushes 27, 27 and the valve element 17, so that the valve element 17 is rotatably supported by the valve body 13. Thus, the butterfly valve 11 can be assembled.

Next, an operation performed when closing the butterfly valve 11 shown in FIG. 1 will be described.

When the valve stem 19 is rotated by an actuator not shown from the state where the butterfly valve 11 is fully opened, the valve element 17 is rotated accompanied by the rotation so that the outer peripheral edge surface of the valve element 17 is brought into pressure contact with the inner peripheral surface of the seat ring 15, and thus a gap between the valve element 17 and the seat rings 15 is sealed so that a full closed state is achieved. The flange portion 27a and the annular projection portion 27b of the bush 27 abut on the recessed fitting portion 29 and the groove fitting portion 31, respectively, of the seat ring 15, and the top surface of the flange portion 27a of the bush 27 is pressed against the inner circumferential side of the seat ring 15 by the inner peripheral surface of the internal flow passage 13a of the valve body 13. Therefore, a liquid can be prevented from leaking between the outer peripheral surface of the seat ring 15 and the inner peripheral surface of the internal flow passage 13a of the valve body 13 from the seal portion between the seat ring 15 and the bush 27. Further, the gap between the bush 27 and the valve elements 17 is sealed with the seal member 35 in the recessed bush fitting portion 33 of the valve stem hole 17a of the valve element 17. Therefore, a fluid can be prevented from leaking to a gap between the valve stem hole 17a and the valve element 17.

Furthermore, due to the fact that the seat ring 15 is mounted on the inner peripheral surface of the internal flow passage 13a in such a manner as to sandwich the valve body 13 between the two flange portions 15b, 15b of the seat ring 15 and the fact that the arcuate projection 23 formed on the outer peripheral surface of the seat ring 15 is fitted to the arcuate groove 25 formed in the inner peripheral surface of the internal flow passage 13a of the valve body 13, an effect is exhibited which prevents the seat ring 15 from moving in the flow passage axis direction by friction caused between the outer peripheral surface of the valve element 17 and the inner peripheral surface of the seat ring 15 in opening and closing the valve or the action of the water pressure on the seat ring 15 in closing the valve. When the arcuate projection 23 is formed so as to have a rectangular cross-sectional shape, the effect of preventing the seat ring 15 from moving in the flow passage axis direction can be further improved as compared with a case where a corner portion has a curved shape. The arcuate projection 23 is not provided near the through-hole 15c which the bush 27 is inserted into and fitted to, and therefore the width of the arcuate projection 23 does not need to be larger than the flange portion 27a of the bush 27 and an increase in material cost for providing the arcuate projection 23 can be suppressed. When the pressure of a fluid acts on the seat ring 15 in closing the valve, the seat ring 15 is likely to move relative to the valve body 13 at a position furthest away from a through-hole region of the seat ring 15 to be fixed to the valve body 13 by the valve stem 19 extending through the through-holes 15c, i.e., a position apart by 90° around the center axis of the seat ring 15 from the center of the through-hole 15c (i.e., center position in the transverse direction). Therefore, the arcuate projection 23 preferably extends by an equal length toward each through-hole 15c from the center position in the transverse direction and more preferably extends within the range of ±45° around the center axis from the center position in the transverse direction.

Additionally, due to the fact that the arcuate projection 23 is provided, the center in the flow passage axis direction of the ring body 15a abutting on the outer peripheral edge surface of the valve element 17 in closing the valve becomes thicker and the compression allowance of the seat ring 15 becomes larger. Therefore, the sealability can be improved while suppressing the increase in material cost. The ring body 15a of the seat ring 15 has the inner circumference of a circular shape and the outer circumference of an oval shape so that the thickness near the through-hole 15c is the largest. This reduces unevenness of distribution of seal pressure in a region of the seat ring 15 abutting on the outer peripheral edge surface of the valve element 17 in closing the valve. Further, the arcuate projection 23 is smoothly connected to the ring body 15a via the first curved portion 23a and the second curved portion 23b, and therefore a difference in distribution of seal pressure can be minimized. Thus, by uniformizing the distribution of the seal pressure, an effect of preventing the leakage from the upstream side (primary side) to the downstream side (secondary side) is improved.

As described above, the butterfly valve seat ring 15 and the butterfly valve 11 using the same according to the present invention have been described with reference to the embodiment shown in the figures. However, the present invention is not limited to the embodiment shown in the figures. For example, in the embodiment shown in the figures, the seat ring 15 is formed so as to have the inner peripheral surface of a circular shape and the outer circumference of an oval shape. However, the seat ring 15 may be formed so as to have the inner circumference of an oval shape and the outer circumference of a circular shape.

DESCRIPTION OF REFERENCE NUMERALS 11 butterfly valve
13 valve body
13a internal flow passage
15 seat ring
15a ring body
15b flange portion
15c through-hole
17 valve element
19 valve stem
23 arcuate projection
25 arcuate groove
27 bush

The invention claimed is:
1. A butterfly valve seat ring, adapted to be mounted on an inner peripheral surface of an internal flow passage extending along a flow passage axis and formed in a valve body of a butterfly valve, so that an outer peripheral edge surface of a valve element supported to be rotatable in the internal flow passage by a valve stem supported by the valve body abuts on the butterfly valve seat ring, said butterfly valve seat ring comprising:
a ring body extending in a center axis direction of the ring body and having an outer peripheral surface,
a pair of through-holes penetrating the ring body, through which the valve stem is adapted to pass,
two flange portions extending radially outwardly from end portions of the ring body in the center axis direction thereof, and
two arcuate projections formed on the outer peripheral surface of the ring body between the two flange portions and extending in a circumferential direction of the ring body, each of the two arcuate projections including curved portions at end portions thereof apart from the pair of through-holes to be smoothly connected to the outer peripheral surface of the ring body.

2. The butterfly valve seat ring according to claim 1, wherein the outer peripheral surface of the ring body has an oval shape and an inner peripheral surface of the ring body has a circular shape, so that each of the portions where the pair of through-holes is formed has a thickness thicker than another portion.

3. The butterfly valve seat ring according to claim 1, wherein each of the two arcuate projections has a rectangular shape in a cross section thereof.

4. The butterfly valve seat ring according to claim 2, wherein each of the two arcuate projections has a rectangular shape in a cross section thereof.

5. A butterfly valve comprising:
a valve body having an internal flow passage extending along a flow passage axis inside the valve body;
the seat ring according to claim 1 mounted on an inner peripheral surface of the internal flow passage;
a valve stem extending through the pair of through-holes of the seat ring; and
a valve element having a disk shape and supported to be rotatable in the valve body by the valve stem,
wherein the seat ring is mounted on the inner peripheral surface of the internal flow passage of the valve body in a state where each of the two arcuate projections formed on the outer peripheral surface of the seat ring is fitted to an arcuate groove formed on the inner peripheral surface of the internal flow passage of the valve body, and the valve element is rotated in the valve body so that an outer peripheral edge surface of the valve element is brought into pressure contact with or separated from an inner peripheral surface of the seat ring, thereby opening and closing the valve.

6. The butterfly valve according to claim 5, further comprising a bush inserted into and fitted to each of the pair of through-holes.

7. The butterfly valve according to claim 1, wherein each of the two arcuate projections extends from a center position between the pair of through-holes in the circumferential direction of the ring body to positions at angles of plus and minus 45 degrees around the center axis of the ring body from the center position between the pair of through-holes.

8. The butterfly valve according to claim 1, wherein each of the two arcuate projections has a center portion between the pair of through-holes in the circumferential direction of the ring body, and
each of the curved portions is arranged at a middle portion between each of the pair of through-holes and the center position of each of the two arcuate projections.

9. The butterfly valve according to claim 7, wherein each of the curved portions includes a convex curved portion, and a concave curved portion connecting the convex curved portion and the outer peripheral surface of the ring body and having a curvature smaller than that of the convex curved portion to minimize a difference in distribution of seal pressure, and the ring body further includes tab portions extending in a direction approaching each other from outer peripheral edge portions of the two flange portions adapted to engage the valve body.

* * * * *